US012753078B2

(12) United States Patent
Liu et al.

(10) Patent No.: US 12,753,078 B2
(45) Date of Patent: Oct. 6, 2026

(54) PREPARATION METHOD FOR IRON PHOSPHATE POWDER BY MICROPOROUS FILTRATION AND CONCENTRATION AND PREPARATION DEVICE THEREOF

(71) Applicant: ZHEJIANG DONG'OU FILTERING MACHINERY MANUFACTURING CO., LTD., Lishui (CN)

(72) Inventors: Yiling Liu, Lishui (CN); Jinfu Chen, Lishui (CN); Shikai Zhao, Lishui (CN); Chao Yu, Lishui (CN)

(73) Assignee: ZHEJIANG DONG'OU FILTERING MACHINERY MANUFACTURING CO., LTD., Lishui (CN)

( * ) Notice: Subject to any disclaimer, the term of this patent is extended or adjusted under 35 U.S.C. 154(b) by 456 days.

(21) Appl. No.: 18/559,817

(22) PCT Filed: Nov. 23, 2022

(86) PCT No.: PCT/CN2022/133736
§ 371 (c)(1),
(2) Date: Nov. 9, 2023

(87) PCT Pub. No.: WO2023/066410
PCT Pub. Date: Apr. 27, 2023

(65) Prior Publication Data

US 2024/0246822 A1 Jul. 25, 2024

(30) Foreign Application Priority Data

Oct. 18, 2021 (CN) ......................... 202111208777.3

(51) Int. Cl.
*C01B 25/37* (2006.01)
*B01D 61/14* (2006.01)
(Continued)

(52) U.S. Cl.
CPC .......... *C01B 25/375* (2013.01); *B01D 61/147* (2013.01); *B01F 27/191* (2022.01); *B01J 19/0066* (2013.01); *B01J 19/18* (2013.01)

(58) Field of Classification Search
None
See application file for complete search history.

(56) References Cited

FOREIGN PATENT DOCUMENTS

CN 210237156 U * 4/2020

OTHER PUBLICATIONS

Machine Translation of CN-210237156 (Year: 2020).*

* cited by examiner

*Primary Examiner* — Michael Forrest
(74) *Attorney, Agent, or Firm* — IPro, PLLC

(57) ABSTRACT

A preparation method for iron phosphate powder by microporous filtration and concentration and a preparation device thereof is provided. The preparation method includes: putting raw materials into a reactor to react for nucleation, a mother liquor generated after raw materials reaction entering the filter concentrator, and controlling and starting a stirring shaft for driving an upper stirring blade and a lower stirring blade to rotate for grinding and scaling; when a mother solution level exceeds an upper liquid inlet end of lower microporous filtration tube groups, controlling and starting a filtrate valve of a filtrate tube of the lower microporous filtration tube groups, and when the mother solution level exceeds the upper liquid inlet end of upper microporous filtration tube groups, controlling and starting a filtrate valve of a filtrate tube of the upper microporous filtration tube groups.

2 Claims, 1 Drawing Sheet

(51) Int. Cl.
*B01F 27/191* (2022.01)
*B01J 19/00* (2006.01)
*B01J 19/18* (2006.01)

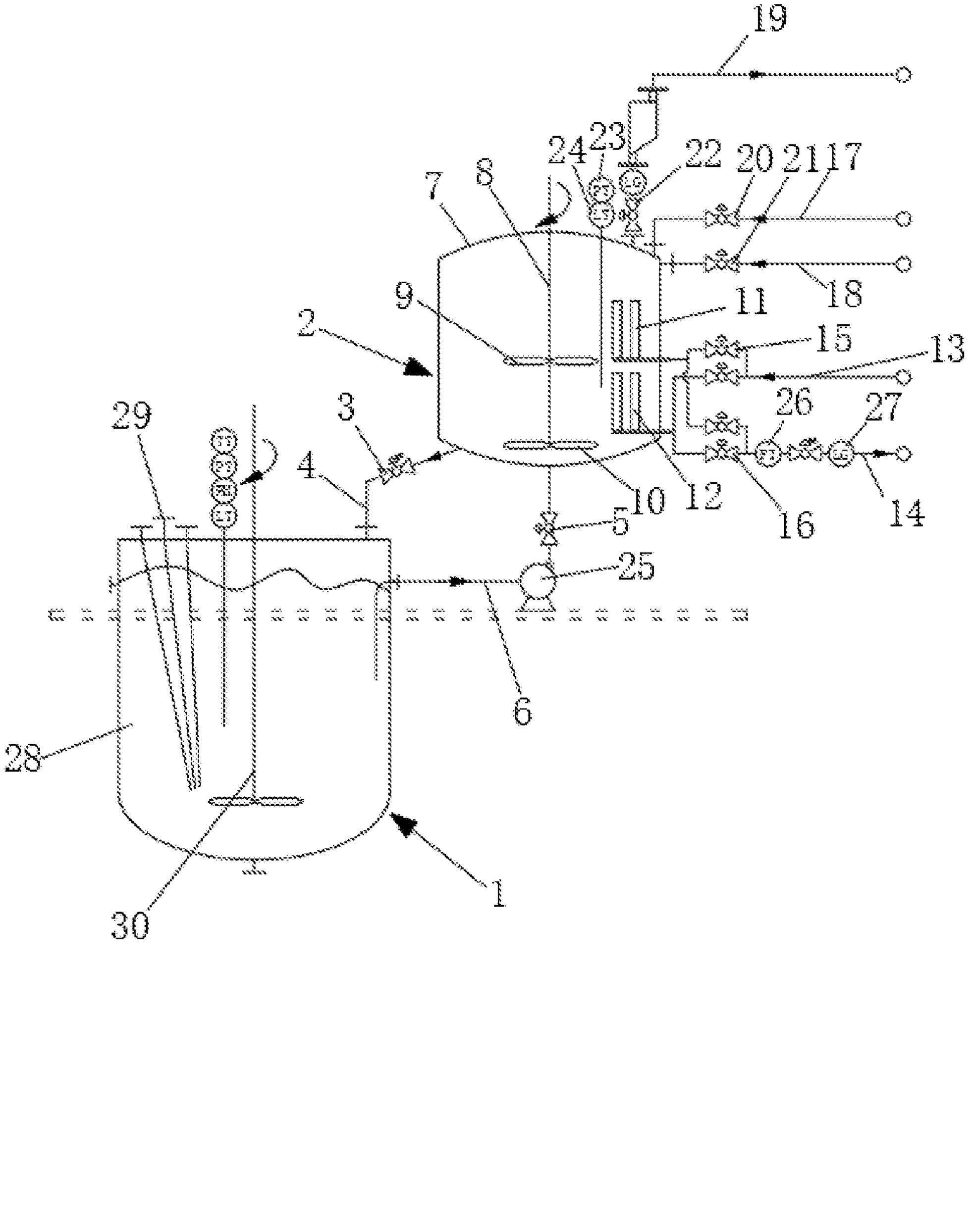
19
24
23
22
20
21
17
7
8
18
9
11
2
15
13
29
3
26
27
4
10
12
16
14
5
25
6
28
1
30

PREPARATION METHOD FOR IRON PHOSPHATE POWDER BY MICROPOROUS FILTRATION AND CONCENTRATION AND PREPARATION DEVICE THEREOF

TECHNICAL FIELD

The present invention relates to the technical field of iron phosphate powder, and particularly relates to a preparation method for iron phosphate powder by microporous filtration and concentration and a preparation device thereof.

BACKGROUND

Iron phosphate powder is widely used as an important material for the positive electrode of the lithium ion battery. In the present production, the iron phosphate powder is generally prepared by connecting a reactor successively with an intermediate tank and a device of a filtration system. After the reactor is overflowed to the intermediate mixing tank, mother solution is pressed into a filter concentrator by a pump and filtered through a microporous filtration tube. Quantitative filtrate is continuously discharged, and the slurry is immediately returned to the reactor to continue to grow crystal. However, due to the intermediate tank, the device has the problems of long reaction process and large volume, and a single microporous filtration tube is difficult to meet the requirements of smooth and stable outflow rate, resulting in large instantaneous flow fluctuation and thus causing poor accuracy of the reaction system.

SUMMARY

The purpose of the present invention is to provide a preparation method for iron phosphate powder by microporous filtration and concentration and a preparation device thereof. The present invention has small instantaneous flow fluctuation, has the characteristic of good accuracy of the reaction system, and integrates a filtration system and an intermediate tank to effectively reduce the volume and shorten the reaction process.

The technical solution of the present invention: the preparation method for iron phosphate powder by microporous filtration and concentration comprises: putting raw materials into a reactor to react for nucleation, a mother liquor generated after raw materials reaction entering the filter concentrator, controlling and starting of a stirring shaft for driving an upper stirring blade and a lower stirring blade to rotate for grinding and scaling; when a mother solution level exceeds an upper liquid inlet end of lower microporous filtration tube groups, controlling and starting of a filtrate valve of a filtrate tube of the lower microporous filtration tube groups, and when the mother solution level exceeds the upper liquid inlet end of upper microporous filtration tube groups, controlling and starting of a filtrate valve of a filtrate tube of the upper microporous filtration tube groups; after the filtrate valves of the filtrate tubes of the upper microporous filtration tube groups and the lower microporous filtration tube groups are all started, turning on and turning off the filtrate valves of the upper microporous filtration tube groups and the lower microporous filtration tube groups successively with a same period of time, and during each period, a group of the upper microporous filtration tube groups or the lower microporous filtration tube groups is in a state of restarting the filtrate; and returning the filtered slurry into the reactor through a slurry circulating tube to continue to grow crystals, and extracting iron phosphate powder from a solid product.

In the above preparation method for the iron phosphate powder by microporous filtration and concentration, the opening and closing cycles of the upper microporous filtration tube groups and the lower microporous filtration tube groups are 3-30 minutes.

The above preparation device for the iron phosphate powder by microporous filtration and concentration comprises a reactor and a filter concentrator; a slurry circulating tube with a slurry circulating valve and a feed tube with a feed valve are arranged between the reactor and the filter concentrator; the filter concentrator comprises a filtration and concentration tank body; an inner cavity of the filtration and concentration tank body is provided with a stirring shaft connected with a motor; the stirring shaft is provided with an upper stirring blade and a lower stirring blade which are arranged up and down; one side of the upper stirring blade and the lower stirring blade is provided with a plurality of upper microporous filtration tube groups and a plurality of lower microporous filtration tube groups which are arranged up and down; the upper liquid inlet end of the upper microporous filtration tube groups is located above the upper stirring blade, and the upper liquid inlet end of the lower microporous filtration tube groups is located between the upper stirring blade and the lower stirring blade; lower liquid outlet ends of the upper microporous filtration tube groups and the lower microporous filtration tube groups are provided with a blowback and recoil tube and a filtrate tube connected with the upper microporous filtration tube groups and the lower microporous filtration tube groups and extended to the outside of the filtration and concentration tank body; and the blowback and recoil tube and the filtrate tube are respectively provided with a blowback and recoil valve and a filtrate valve.

In the above preparation device for the iron phosphate powder by microporous filtration and concentration, the filtration and concentration tank body is provided with an aeration tube, a positive blowing tube and an emptying and accumulating tube which are communicated with the inner cavity, and the aeration tube, the positive blowing tube and the emptying and accumulating tube are respectively provided with a corresponding aeration valve, a positive blowing valve and an emptying valve.

In the above preparation device for the iron phosphate powder by microporous filtration and concentration, the upper microporous filtration tube groups and the lower microporous filtration tube groups are formed by polyethylene sintering molding.

In the above preparation device for the iron phosphate powder by microporous filtration and concentration, the apertures of the upper microporous filtration tube groups and the lower microporous filtration tube groups are 1-15 μm.

In the above preparation device for the iron phosphate powder by microporous filtration and concentration, the feed tube is provided with a diaphragm pump.

In the above preparation device for the iron phosphate powder by microporous filtration and concentration, the filtration and concentration tank body is provided with a pressure gauge and a level gauge; and the level gauge is a capacitance level gauge, and a lower end part is located below the upper liquid inlet end of the lower microporous filtration tube groups.

In the above preparation device for the iron phosphate powder by microporous filtration and concentration, the filtrate tube is provided with a flowmeter and a sight glass.

In the above preparation device for the iron phosphate powder by microporous filtration and concentration, the reactor comprises a reaction tank body, the top surface of the reaction tank body is provided with a feed port, and a reaction stirring device is arranged in the reaction tank body.

Compared with the prior art, the present invention integrates the filtration system and the intermediate tank to effectively reduce the volume and shorten the reaction process. The upper microporous filtration tube groups and the lower microporous filtration tube groups are arranged respectively and controlled separately, and reasonably arranged with the positions of the upper stirring blade and the lower stirring blade. When starting, the upper microporous filtration tube groups and the lower microporous filtration tube groups can be gradually opened with the level gauge, so as to reduce the resistance during the discharge of filtrate, increase the instantaneous flow and reduce the pressure of the filter concentrator, to reduce the filtration resistance. After full opening, the upper microporous filtration tube groups and the lower microporous filtration tube groups are independently controlled for periodic closure, so that a group of the upper microporous filtration tube groups or the lower microporous filtration tube groups is restarted to discharge the filtrate in each period to ensure the smooth and stable outflow rate of the filtrate and small instantaneous flow fluctuation and greatly reduce the fluctuation of the liquid level of the reactor, so as to improve the accuracy of the reaction system.

BRIEF DESCRIPTION OF THE DRAWINGS

FIG. 1 is a structural schematic diagram of the present invention.

REFERENCE SIGNS

1 reactor; 2 filter concentrator; 3 slurry circulating valve; 4 slurry circulating tube; 5 feed valve; 6 feed tube; 7 filtration and concentration tank body; 8 stirring shaft; 9 upper stirring blade; 10 lower stirring blade; 11 upper microporous filtration tube group; 12 lower microporous filtration tube group; 13 blowback and recoil tube; 14 filtrate tube; 15 blowback and recoil valve; 16 filtrate valve; 17 aeration tube; 18 positive blowing tube; 19 emptying and accumulating tube; 20 aeration valve; 21 positive blowing valve; 22 emptying valve; 23 pressure gauge; 24 level gauge; 25 diaphragm pump; 26 flowmeter; 27 sight glass; 28 reaction tank body; 29 feed port; 30 reaction stirring device.

DETAILED DESCRIPTION

The present invention will be further described below in combination with the drawings and the embodiments, and the following embodiments are not the basis of limitation to the present invention.

Embodiments: a preparation method for iron phosphate powder by microporous filtration and concentration and a preparation device thereof, as shown in FIG. 1, comprising a reactor 1 and a filter concentrator 2; a slurry circulating tube 4 with a slurry circulating valve 3 and a feed tube 6 with a feed valve 5 are arranged between the reactor 1 and the filter concentrator 2; the filter concentrator 2 comprises a filtration and concentration tank body 7; an inner cavity of the filtration and concentration tank body 7 is provided with a stirring shaft 8 connected with a motor; the stirring shaft 8 is provided with an upper stirring blade 9 and a lower stirring blade 10 which are four oblique blades; one side of the upper stirring blade 9 and the lower stirring blade 10 is provided with two upper microporous filtration tube groups 11 and two lower microporous filtration tube groups 12 which are arranged up and down; the upper liquid inlet end of the upper microporous filtration tube groups 11 is located above the upper stirring blade 9, and the upper liquid inlet end of the lower microporous filtration tube groups 12 is located between the upper stirring blade 9 and the lower stirring blade 10; lower liquid outlet ends of the upper microporous filtration tube groups 11 and the lower microporous filtration tube groups 12 are provided with a blowback and recoil tube 13 and a filtrate tube 14 connected with the upper microporous filtration tube groups 11 and the lower microporous filtration tube groups 12 and extended to the outside of the filtration and concentration tank body 7; and the blowback and recoil tube 13 and the filtrate tube 14 are respectively provided with a blowback and recoil valve 15 and a filtrate valve 16. The filtration and concentration tank body 7 is provided with an aeration tube 17, a positive blowing tube 18 and an emptying and accumulating tube 19 which are communicated with the inner cavity, and the aeration tube 17, the positive blowing tube 18 and the emptying and accumulating tube 19 are respectively provided with a corresponding aeration valve 20, a positive blowing valve 21 and an emptying valve 22. The filtration and concentration tank body 7 is provided with a pressure gauge 23 and a level gauge 24; and the upper microporous filtration tube groups 11 and the lower microporous filtration tube groups 12 are formed by polyethylene sintering molding. The apertures of the upper microporous filtration tube groups 11 and the lower microporous filtration tube groups 12 are 1-15 μm. The feed tube 6 is provided with a diaphragm pump 25, and the feed of diaphragm pump 25 is 3-20 times of filtrate flow in filter concentrator 2. The level gauge 24 is a capacitance level gauge, and a lower end part is located below the upper liquid inlet end of the lower microporous filtration tube groups 12. The filtrate tube 14 is provided with a flowmeter 26 and a sight glass 27. The reactor 1 comprises a reaction tank body 28, the top surface of the reaction tank body 28 is provided with a feed port 29, and a reaction stirring device 30 is arranged in the reaction tank body 28. In the present embodiment, all valves, pumps and sensors are connected with a full automatic PLC/DCS control system and controlled through a control system. It should be noted that the protection scope of the present invention is the connection structure and production process of the device, and is not an improvement of the control system. The control system can be realized and completed by those skilled in the art according to their technical ability.

The preparation method of the preparation device for iron phosphate powder by microporous filtration and concentration is used for putting raw materials into the reactor 1 to react for nucleation, a mother liquor generated after raw materials reaction entering the filter concentrator 2, controlling and starting of the stirring shaft 8 for driving the upper stirring blade 9 and the lower stirring blade 10 to rotate for grinding and scaling; when a mother solution level exceeds the upper liquid inlet end of lower microporous filtration tube groups 12, controlling and starting of a filtrate valve 16 of a filtrate tube 14 of the lower microporous filtration tube groups 12, and when the mother solution level exceeds the upper liquid inlet end of upper microporous filtration tube groups 11, controlling and starting of a filtrate valve 16 of a filtrate tube 14 of the upper microporous filtration tube groups 11; after the filtrate valves 16 of the filtrate tubes 14 of the upper microporous filtration tube groups 11 and the lower microporous filtration tube groups 12 are started, one group of four groups of the upper microporous filtration tube groups 11 and the lower microporous filtration tube groups 12 is closed every 3-30 minutes, the first group is stared and the second group is closed in the next 3-30 minutes, and the second group is started and the third group is closed in the following 3-30 minutes and so on, so that a group of the upper microporous filtration tube groups 11 or the lower microporous filtration tube groups 12 is restarted to discharge the filtrate at fixed time intervals. The filtered slurry is returned into the reactor 1 through the slurry circulating tube 4 to continue to grow crystals, and the iron phosphate powder is extracted through the solid product. It should be noted that the protection point of the method of the present invention is the structure and filtration regulation, that is, the upper microporous filtration tube groups and the lower microporous filtration tube groups are arranged in the corresponding positions of the upper stirring blade and the lower stirring blade, and the upper microporous filtration tube groups and the lower microporous filtration tube groups are gradually opened and then periodically opened and closed successively, so as to make the outflow rate of the filtrate smooth and stable. The instantaneous flow fluctuation range is small, which greatly reduces the fluctuation of the liquid level of the reactor, thereby improving the accuracy of the reaction system. Therefore, it is not an improvement of the specific chemical process, parameters, counterweight and raw materials. The preparation process, parameters, counterweight and raw materials of the above iron phosphate powder are all technical means that are well known and mastered by those skilled in the art.

The present invention integrates the filtration system and the intermediate tank to effectively reduce the volume and shorten the reaction process. The upper microporous filtration tube groups and the lower microporous filtration tube groups are arranged respectively and controlled separately, and reasonably arranged with the positions of the upper stirring blade and the lower stirring blade. When starting, the upper microporous filtration tube groups and the lower microporous filtration tube groups can be gradually opened with the level gauge, so as to reduce the resistance during the discharge of filtrate, increase the instantaneous flow and reduce the pressure of the filter concentrator, to reduce the filtration resistance. After full opening, the upper microporous filtration tube groups and the lower microporous filtration tube groups are independently controlled for periodic closure, so that a group of the upper microporous filtration tube groups or the lower microporous filtration tube groups is restarted to discharge the filtrate in each period to ensure the smooth and stable outflow rate of the filtrate and small instantaneous flow fluctuation and greatly reduce the fluctuation of the liquid level of the reactor, so as to improve the accuracy of the reaction system.

The invention claimed is:

1. A preparation method for iron phosphate powder by microporous filtration and concentration, wherein the preparation method is applied to a preparation device for iron phosphate powder by microporous filtration and concentration;

the preparation device for iron phosphate powder by microporous filtration and concentration comprises
- a reactor (1) and a filter concentrator (2);
- a slurry circulating tube (4) with a slurry circulating valve (3) and a feed tube (6) with a feed valve (5) are arranged between the reactor (1) and the filter concentrator (2);
- the filter concentrator (2) comprises a filtration and concentration tank body (7);
- an inner cavity of the filtration and concentration tank body (7) is provided with a stirring shaft (8) connected with a motor;
- the stirring shaft (8) is provided with an upper stirring blade (9) and a lower stirring blade (10) arranged up and down;
- a plurality of upper microporous filtration tube groups (11) and a plurality of lower microporous filtration tube groups (12) arranged on one side of an inner cavity of the filtration and concentration tank body (7) corresponding to the upper stirring blade (9) and the lower stirring blade (10) respectively;
- an upper liquid inlet end of the upper microporous filtration tube groups (11) is located above the upper stirring blade (9), and an upper liquid inlet end of the lower microporous filtration tube groups (12) is located between the upper stirring blade (9) and the lower stirring blade (10);
- lower liquid outlet ends of the upper microporous filtration tube groups (11) and the lower microporous filtration tube groups (12) are provided with a blowback and recoil tube (13) and a filtrate tube (14) connected with the upper microporous filtration tube groups (11) and the lower microporous filtration tube groups (12) and extended to the outside of the filtration and concentration tank body (7);
- and the blowback and recoil tube (13) and the filtrate tube (14) are respectively provided with a blowback and recoil valve (15) and a filtrate valve (16);

the preparation method comprises:
- (1) putting raw materials into the reactor to react for nucleation,
- (2) a mother liquor generated after raw materials reaction entering the filter concentrator,
- (3) controlling and starting of the stirring shaft for driving the upper stirring blade and the lower stirring blade to rotate for grinding and scaling;
- (4) when a mother solution level exceeds the upper liquid inlet end of the lower microporous filtration tube groups, controlling and starting the filtrate valve of the filtrate tube of the lower microporous filtration tube groups, and
- (5) when the mother solution level exceeds the upper liquid inlet end of upper microporous filtration tube groups, controlling and starting of the filtrate valve of the filtrate tube of the upper microporous filtration tube groups;
- (6) after the filtrate valves of the filtrate tubes of the upper microporous filtration tube groups and the lower microporous filtration tube groups are all started, turning on and turning off the filtrate valves of the upper microporous filtration tube groups and the lower microporous filtration tube groups successively with a same period of time, and
- (7) during each period, a group of the upper microporous filtration tube groups or the lower microporous filtration tube groups is in a state of restarting and discharging the filtrate; and
- (8) returning the filtered slurry into the reactor through the slurry circulating tube to continue to grow crystals, and extracting iron phosphate powder from a solid product.

2. The preparation method for iron phosphate powder by microporous filtration and concentration according to claim 1, wherein one group of the upper microporous filtration tube groups (11) and the lower microporous filtration tube groups (12) is restarted to discharge the filtrate at fixed time interval of 3-30 minutes.

* * * * *